United States Patent
D'Ercoli et al.

(10) Patent No.: US 10,558,844 B2
(45) Date of Patent: Feb. 11, 2020

(54) LIGHTWEIGHT 3D VISION CAMERA WITH INTELLIGENT SEGMENTATION ENGINE FOR MACHINE VISION AND AUTO IDENTIFICATION

(71) Applicant: Datalogic IP Tech S.r.l., Lippo di Calderara di Reno (IT)

(72) Inventors: Francesco D'Ercoli, Bologna (IT); Alessandro Brunetta, Padua (IT); Silvia Marinoni, Castenaso (IT); Davide Benghi, Monte San Pietro (IT)

(73) Assignee: DATALOGIC IP TECH S.r.l., Lippo di Calderara di (IT)

( * ) Notice: Subject to any disclaimer, the term of this patent is extended or adjusted under 35 U.S.C. 154(b) by 84 days.

(21) Appl. No.: 15/845,695

(22) Filed: Dec. 18, 2017

(65) Prior Publication Data

US 2019/0188451 A1 Jun. 20, 2019

(51) Int. Cl.
*G06T 7/73* (2017.01)
*G06F 16/583* (2019.01)
(Continued)

(52) U.S. Cl.
CPC ..... *G06K 9/00208* (2013.01); *G06F 16/5838* (2019.01); *G06K 9/00214* (2013.01); *G06K 9/3233* (2013.01); *G06K 9/4638* (2013.01); *G06K 9/6211* (2013.01); *G06T 7/75* (2017.01); *G06K 2209/19* (2013.01); *G06T 2207/20212* (2013.01)

(58) Field of Classification Search
CPC .............. G06F 16/289; G06K 9/00208; G06K 9/00214
See application file for complete search history.

(56) References Cited

U.S. PATENT DOCUMENTS 6,002,782 A * 12/1999 Dionysian .......... G06K 9/00208
382/118
6,792,401 B1 * 9/2004 Nigro .................. G02C 13/003
703/6

(Continued)

FOREIGN PATENT DOCUMENTS

| CN | 103033145 A | 4/2013 |
| WO | 2016167947 A1 | 10/2016 |
| WO | 2017056035 A1 | 4/2017 |

OTHER PUBLICATIONS

US 9,721,135 B2, 08/2017, Todeschini et al. (withdrawn)
(Continued)

*Primary Examiner* — Santiago Garcia
(74) *Attorney, Agent, or Firm* — Shook, Hardy & Bacon, L.L.P.

(57) ABSTRACT

Various embodiments of the invention are implemented for an entry level, compact and lightweight single package apparatus combining a conventional high-resolution two-dimensional (2D) camera with a low-resolution three-dimensional (3D) depth image camera, capable to learn, through depth information, how to improve the performance of a set of 2D identification and machine vision algorithms in terms of speed-up (e.g. through regions of interests (ROIs)) and raw discriminative power. The cameras simultaneously capture images that are processed by an Intelligent Segmentation Engine in the system to facilitate object recognition.

18 Claims, 4 Drawing Sheets

(51) Int. Cl.
  G06K 9/46 (2006.01)
  G06K 9/62 (2006.01)
  G06K 9/00 (2006.01)
  G06K 9/32 (2006.01)

(56) References Cited

U.S. PATENT DOCUMENTS

| | | | | |
|---|---|---|---|---|
| 8,538,078 | B2* | 9/2013 | Berkovich | G06K 9/00214 382/103 |
| 9,069,075 | B2* | 6/2015 | Zeng | G01S 17/58 |
| 2003/0146901 | A1* | 8/2003 | Ryan | G06F 3/013 345/158 |
| 2004/0103093 | A1* | 5/2004 | Furuhashi | G06K 9/00208 |
| 2005/0219357 | A1* | 10/2005 | Sun | G02B 27/26 348/57 |
| 2006/0120576 | A1* | 6/2006 | Chen | G06K 9/00033 382/124 |
| 2006/0140473 | A1* | 6/2006 | Brooksby | G01N 21/9515 382/154 |
| 2007/0110320 | A1* | 5/2007 | Choi | G06K 9/00208 382/203 |
| 2010/0309288 | A1* | 12/2010 | Stettner | G01S 17/023 348/43 |
| 2011/0085790 | A1* | 4/2011 | Pace | G03B 35/00 396/326 |
| 2011/0249175 | A1* | 10/2011 | Lo | G03B 35/04 348/362 |
| 2011/0255746 | A1* | 10/2011 | Berkovich | G06K 9/00214 382/103 |
| 2012/0195583 | A1* | 8/2012 | Pace | G03B 35/08 396/326 |
| 2012/0268609 | A1* | 10/2012 | Yoo | G06K 9/00342 348/180 |
| 2012/0289836 | A1* | 11/2012 | Ukimura | A61B 8/085 600/463 |
| 2013/0209082 | A1* | 8/2013 | Cameron | H04N 13/25 396/323 |
| 2013/0249908 | A1* | 9/2013 | Black | G06T 17/00 345/420 |
| 2014/0003665 | A1* | 1/2014 | Hoshino | G06K 9/4652 382/103 |
| 2014/0129990 | A1* | 5/2014 | Xin | G06F 3/017 715/849 |
| 2014/0229145 | A1* | 8/2014 | Van Lierde | A61C 13/0004 703/1 |
| 2015/0269778 | A1* | 9/2015 | Uchiyama | G06K 9/6215 345/633 |
| 2016/0042515 | A1* | 2/2016 | Sorgi | G06T 7/35 382/154 |
| 2016/0150213 | A1* | 5/2016 | Mutti | G01N 33/02 348/143 |
| 2016/0183057 | A1* | 6/2016 | Steiner | H04W 4/027 455/456.1 |
| 2016/0259339 | A1* | 9/2016 | High | E01H 5/12 |
| 2016/0277727 | A1* | 9/2016 | Brown | H04N 13/307 |
| 2017/0132470 | A1* | 5/2017 | Sasaki | G06K 9/00724 |
| 2017/0154204 | A1* | 6/2017 | Ryu | G06K 9/00208 |
| 2017/0262972 | A1* | 9/2017 | Adams | G06T 15/08 |
| 2017/0308736 | A1* | 10/2017 | Sharma | G06T 7/11 |
| 2018/0053247 | A1* | 2/2018 | Lewis | G06Q 30/0643 |
| 2018/0060646 | A1* | 3/2018 | Harvey | G06T 7/33 |
| 2018/0130224 | A1* | 5/2018 | Hoelscher | G06T 17/20 |
| 2018/0137644 | A1* | 5/2018 | Rad | G06T 7/73 |
| 2018/0139431 | A1* | 5/2018 | Simek | H04N 5/2258 |
| 2018/0158230 | A1* | 6/2018 | Yan | G06K 9/00268 |
| 2018/0247154 | A1* | 8/2018 | Kitamura | G06K 9/4628 |
| 2018/0260613 | A1* | 9/2018 | Gao | G06T 7/292 |
| 2019/0033448 | A1* | 1/2019 | Molnar | H04N 13/106 |

OTHER PUBLICATIONS

Ghobadi, (Seyed Eghbal. "Real time object recognition and tracking using 2D/3D images." Date Sep. 16, 2010) (Year: 2010).*

Tan, O et al., "Review: Segmentation and classification methods of 3D medical images," PubMed Commons, Mar. 2002; 26(3): 197-206. https://www.ncbi.nlm.nih.gov/pubmed/16104307.

Basic Thresholding Operations—OpenCV v2.4.2 documentation, Accessed Dec. 9, 2017 at: http://docs.opencv.org/2.4.2/doc/tutorials/imgproc/threshold/threshold.html.

Key Specifications epc660, 3D TOF Imager 320 x 240 Pixel, 2013 ESPROS Photonics Corporation, TS_epc660_Key_Specitications, www.espros.ch.

OpenCV: OpenCV modules, Accessed Dec. 9, 2017 at: https://docs.opencv.org/3.1.0/

TOF 3D Cameras (/EN/PRODUCTS/TOF-3D-CAMERAS/CATEGORY/TOF-3D-CAMERAS/) Accessed Dec. 9, 2017 at: https://www.bluetechnix.com/en/products/tof-3D-cameras.

Tangelder, Johan W.H. et al, "A survey of content based 3D shape retrieval methods," Published online: Dec. 8, 2007, Multimed Tools Appl (2008) 39:441-471, DOI 10.1007/s11042-007-0181-0 http://citeseerx.ist.psu.edu/viewdoc/download?doi=10.1.1.463.7418&rep=rep1&type=pdf.

Lang, Dagmar et al., "Semantic mapping for mobile outdoor robots," Machine Vision Applications (MVA), 2015 14th IAPR International Conference, May 18-22, 2015. Available at: http://ieeexplore.ieee.org/xpl/login.jsp?tp=&arnumber=7153196&url=http%3A%2F%2Fieeexplore.ieee.org%2Fxpls%2Fabs_all.jsp%3Farnumber%3D7153196.

TriSpector 1000 3D Vision Operating Instructions, Sep. 19, 2017. Available at: https://www.sick.com/media/dox/7/67/367/Operating_instructions_TriSpector1000_3D_Vision_en_IM0060367.PDF.

Extended search report dated Apr. 24, 2019 in European Patent Application No. 18213164.9, 7 pages.

* cited by examiner

LIGHTWEIGHT 3D VISION CAMERA WITH INTELLIGENT SEGMENTATION ENGINE FOR MACHINE VISION AND AUTO IDENTIFICATION

CROSS-REFERENCE TO RELATED APPLICATIONS

None.

BACKGROUND OF THE INVENTION

Three-dimensional (3D) imaging is a fast growing trend, especially in the Industrial Automation field, where embedded vision sensors are widely used. Range imaging techniques are spreading not only due to Stereoscopic or Structured Light approaches, but also with new image sensors designed to measure the pixel distance by various methods and technologies, such as time-of-flight (TOF) and light-field (aka plenoptic) cameras.

A relevant example of an industrial, entry-level apparatus (based on different technology and method) is the TriSpector 1000 3D Vision Family manufactured by SICK AG of Waldkirch, Germany. Although a single optimal approach has not yet emerged, the possibility to equip a 3D camera with soft Artificial Intelligence is a very hot topic in the pattern recognition and machine vision community.

BRIEF SUMMARY OF THE INVENTION

An entry level, compact and lightweight single package apparatus combining a conventional two-dimensional (2D) camera with a three-dimensional (3D) depth image camera, capable to learn, through depth information, how to improve the performance of a set of 2D identification and machine vision algorithms in terms of speed-up (e.g. through regions of interests (ROIs)) and raw discriminative power. This is achieved by implementing an "Intelligent Segmentation Engine" (ISE) consisting of an expert system capable of learning and building an incremental history of the known objects, while receiving appropriate feedback from 2D algorithms.

In a first aspect, a method of object recognition in a hybrid 2D/3D vision system is provided that includes acquiring a three-dimensional image of an object into a vision device. The vision device has a processor coupled to a memory. Two-dimensional images of the object are acquired into the vision device. The three-dimensional image is associated with the two-dimensional images. The three-dimensional image is identified through three-dimensional shape recognition. The three-dimensional image is identified by comparing shapes in the three-dimensional image to objects in a database. A union of the shapes generates the three-dimensional image. If a member of the shapes of the three-dimensional image matches to one of the objects in the database, that one of the objects is matched to a region of interest from the two-dimensional images. Simultaneously, the member of the shapes of the three-dimensional image that matches to the one of the objects is matched to the region of interest from the two-dimensional images to speed up an object recognition process. A new region of interest from the two-dimensional images is detected if another member of the shapes of the three-dimensional image does not match to another one of the objects in the database. The new region of interest matches to another member of the shapes of the three-dimensional image.

In another aspect, a method of object recognition in a hybrid 2D/3D vision system is provided that includes acquiring a three-dimensional image of an object into a vision device. The vision device has a processor coupled to a memory. Two-dimensional images of the object are acquired into the vision device. The three-dimensional image is associated with the two-dimensional images. Shape descriptors are computed for the object. The shape descriptors for the object are compared to other shape descriptors that are stored in a database. If a shape descriptor of the object matches one of the other shape descriptors in the database, the object is designated as an old object that is already in the database. The object matches the old object in the database. If the shape descriptor of the object does not match one of the other shape descriptors in the database, the object is designated as a new object and the object is stored in the database. Where the object matches the old object in the database, a weight factor or reinforcement is assigned to the object. The weight factor or reinforcement of the object is increased each time the shape descriptor of the object is used in a comparison and matches to one of the other shape descriptors. The object that is more frequently classified has a stronger reinforcement. For a comparison that is not sufficient, the object that has a strongest reinforcement is used over other objects in the database with lesser reinforcements.

In yet another aspect, a compact and portable device is provided that includes several components. A high-resolution two-dimensional (2D) camera is included in the device. A low-resolution three-dimensional (3D) camera is included in the device. A lighting system is shared by the 2D camera and 3D camera. The 2D camera and 3D camera are mounted together to have parallel optical axes. A first sensor of the 2D camera and a second sensor of the 3D camera point in a same direction and have similar viewing areas. The 3D camera is mounted on top of the 2D camera. The first sensor and the second sensor simultaneously capture a 2D image and 3D image of a same viewing area. The 3D image is mapped into the 2D image to form a composite image.

DETAILED DESCRIPTION OF THE INVENTION

Figure 1:
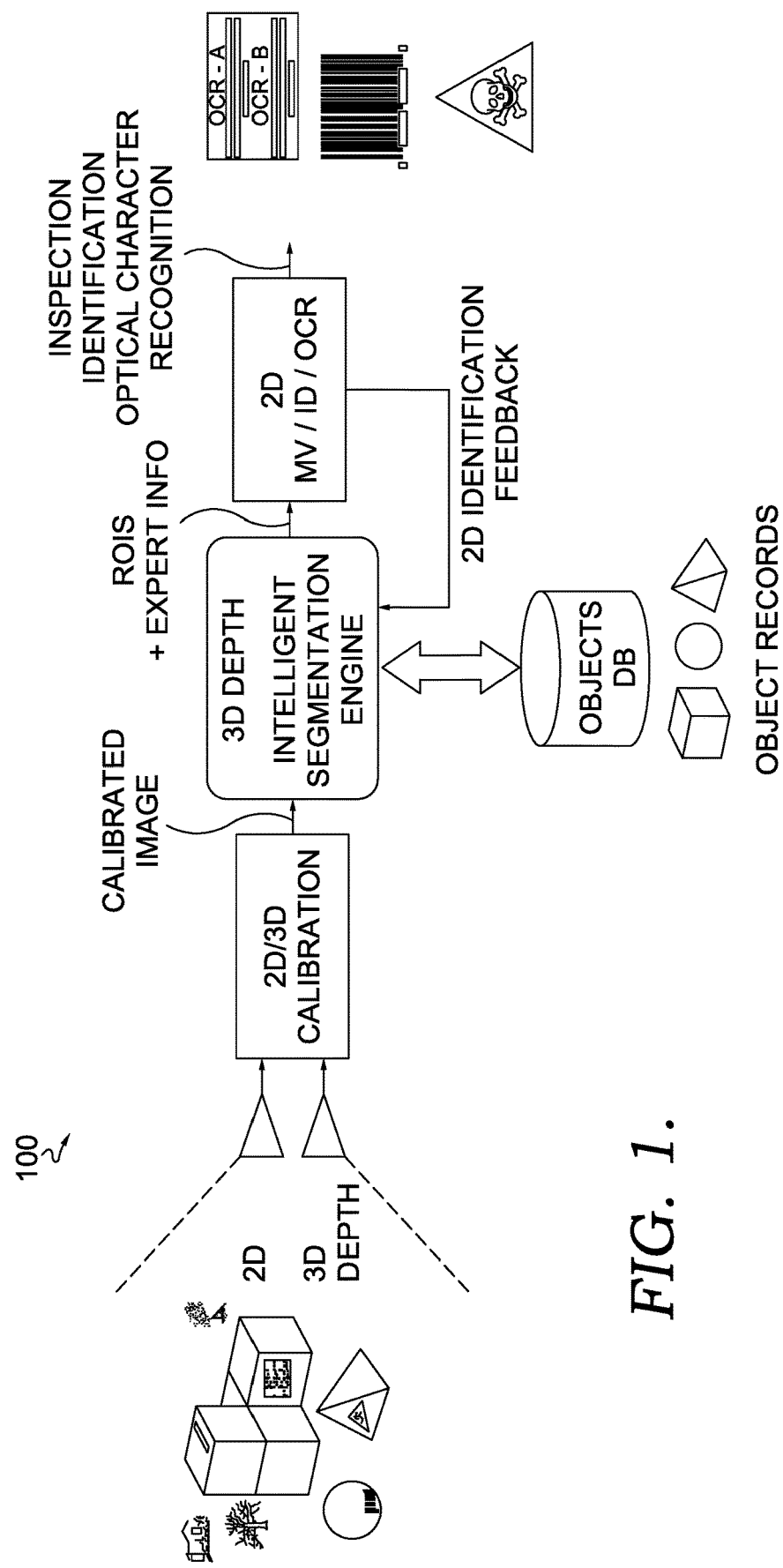
FIG. 1 illustrates an exemplary system combining 2D and 3D cameras for machine vision and identification, in an implementation of an embodiment of the invention.
Figure 2:
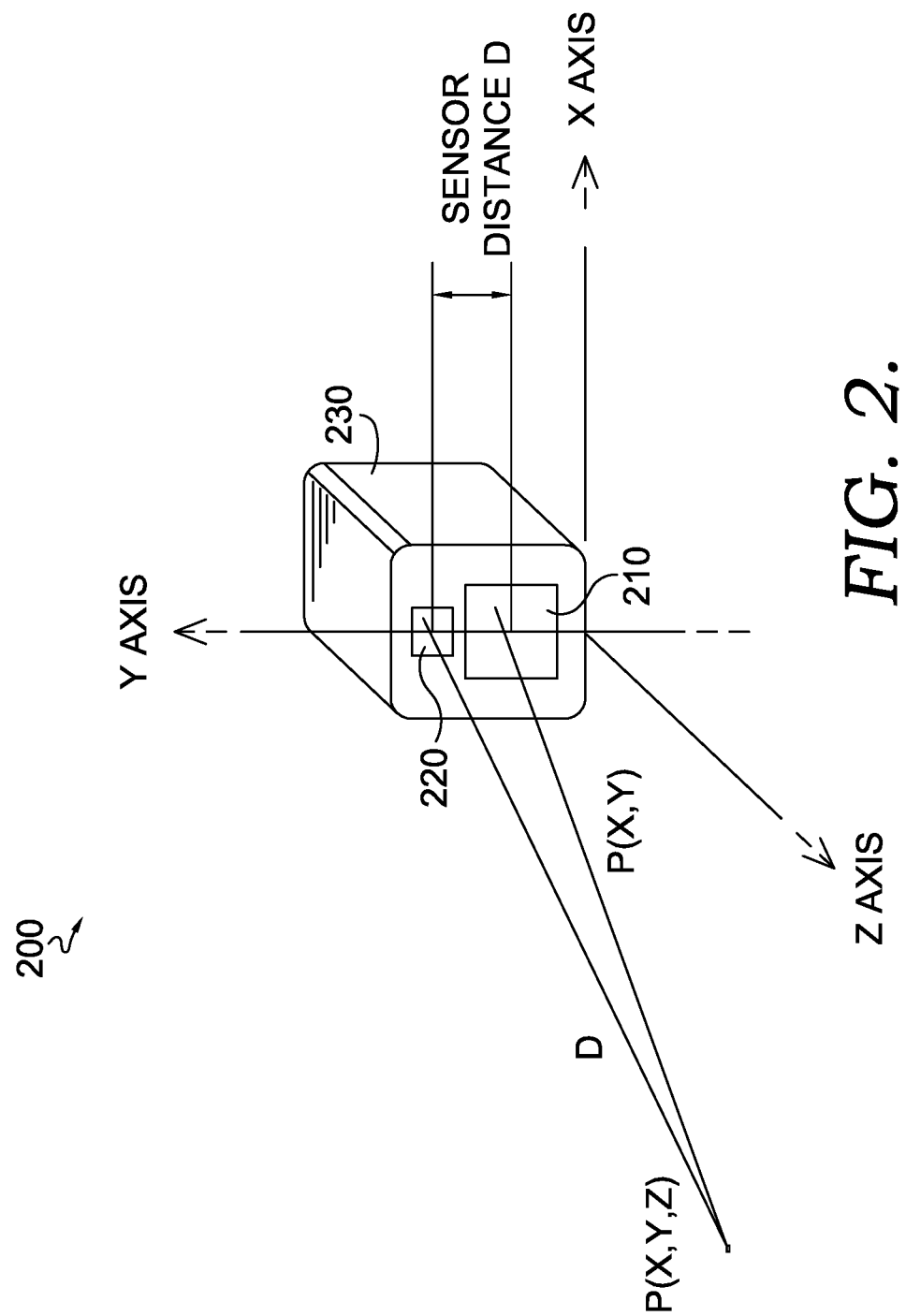
FIG. 2 illustrates an exemplary device combining 2D and 3D cameras, in an implementation of an embodiment of the invention.
Figure 3:
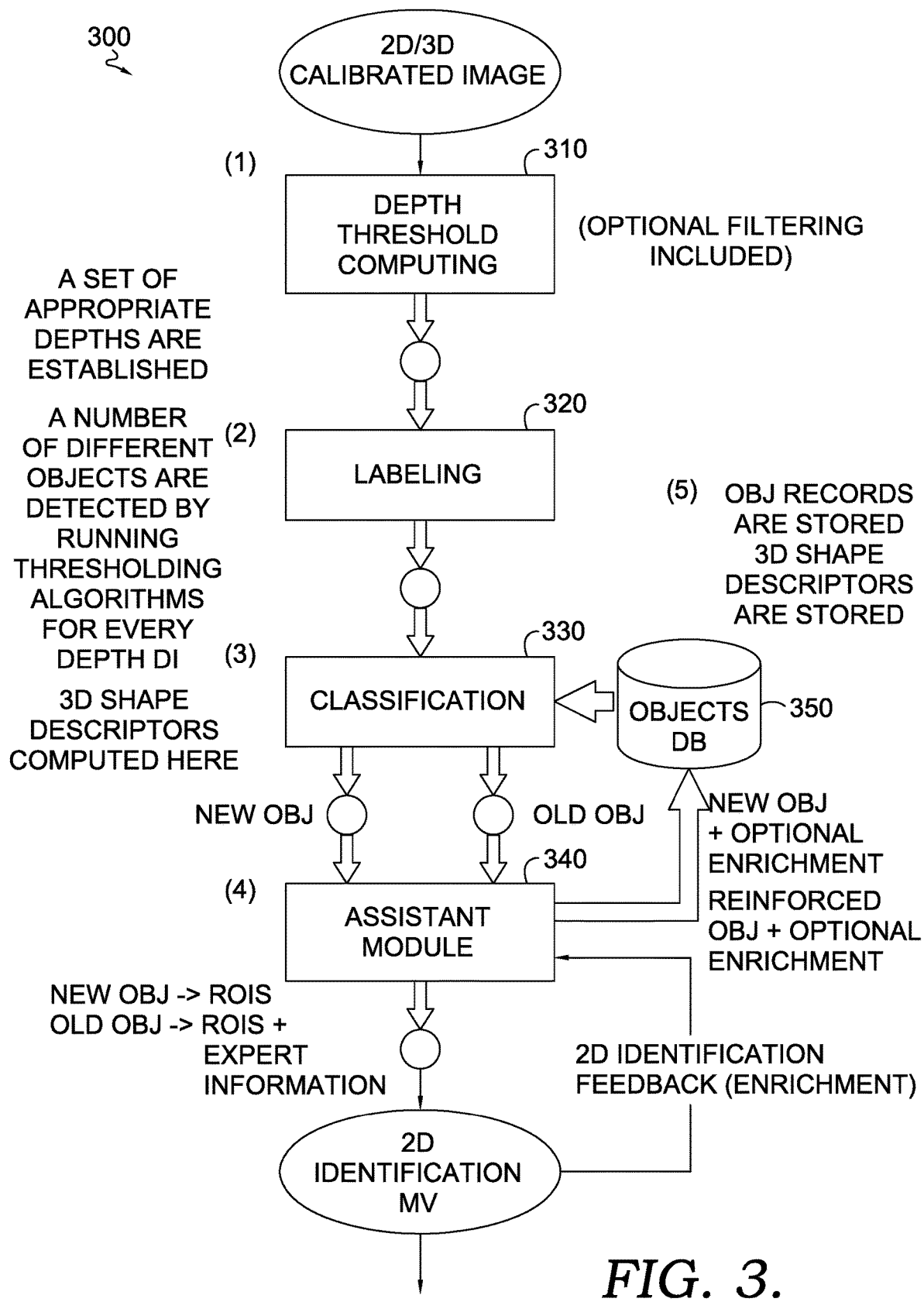
FIG. 3 illustrates an exemplary process of an Intelligent Segmentation Engine (ISE), in an implementation of an embodiment of the invention.

The proposed apparatus and method can be used in automatic identification and machine vision applications, where there is the need for a low-cost solution without depth accuracy requirements mandatory in case of volume dimensioning or body scanning. Combining a low cost 3D-TOF approach with a 2D high-resolution camera in a single package sensor together with an original machine learning segmentation method has some distinctive advantages:

Additional performance and speed-up for inspection and identification (barcode, optical character recognition (OCR)).

Reduced total cost, size and weight for a 3D industrial camera

Reduced computational load involved in 3D image processing (by mean of objects (OBJs) localization)

Reduced memory needs to store 3D images (3D compression: relevant OBJs only)

Reduced network bandwidth needs when a 3D image has to be transmitted

Hybrid 2D/3D intelligent vision systems will be interesting in the next few years to achieve high performances not only in inspection and automatic identification but also in new applications such as:

Gesture recognition for self-shop applications, where high 3D accuracy is not required and the cost is a key-parameter Robotic barcode scanning Augmented Reality rendering: a framework for interactive AR applications, where the depth map is necessary for visual or physical interaction between synthetic and real, identified objects.

Apparatus

An embodiment of the invention consists of a compact, single package vision sensor 200 containing a standard high-resolution 2D camera 210 (brightness image) and a lower resolution 3D camera 220 (depth image) pair, mounted and calibrated in an optical and geometrical environment 230. The resulting, combined camera system 200, is a compact and portable device, with reduced 3D computational overload and power consumption. The combined camera system 200 includes a lighting system.

In a preferred embodiment, system 200 will be shared by the two sensors 210 and 220 (both the sensors optimized for infrared (IR) range), but system 200 could also be composed of two different sensor types (IR-TOF sensor combined with 2D visible range sensor). Even if TOF cameras have less depth accuracy compared to other types of 3D sensors (e.g. laser scanners, structured light, or stereo vision systems), this is not a limitation for the intended purposes of the proposed invention, since it can benefit from the aid of a high-resolution 2D sensor. On the contrary, in respect to other 3D technologies, TOF cameras can be fitted to real-time applications where automatic acquisition of 3D models involves sensor movement.

To maximize the performance of the two-camera combination in system 200, the cameras 210 and 220 should be placed as close as possible to each other. It is proposed that the 3D TOF camera 220 be mounted on top of the 2D camera 210. Moreover, the two sensors 210 and 220 should have appropriate optical systems in order to share similar viewing areas. In this way, the 3D information can be matched to or mapped inside the 2D image. From an operational point of view, the image is frame grabbed simultaneously by both the cameras 210 and 220 and then the TOF image from camera 220 is mapped into the 2D image of camera 210 (a threshold can be applied to the depth image to discard background objects). A TOF sensor can be an industrial, entry level low-cost IR-based depth camera, with a low resolution (320×240 pixels or QVGA).

The TOF camera 220 and the 2D camera 210 are calibrated, and a mapping is made from the depth data to the 2D image. Calibration of 2D and 3D images is a state-of-the-art process, quite similar to a stereo camera calibration problem. It is only a matter of starting from 3D coordinates of the TOF camera 220 to find the corresponding 2D coordinates instead of building 3D coordinates from two sets of 2D coordinates. Given the calibrated image, segmentation will be performed directly on the depth image from the TOF camera 220, without using 2D information from the 2D camera 210. This is a fundamental task for 3D vision, often the very first step. It consists of partitioning the corresponding digital image into groups of pixels (regions) with similar characteristics (e.g. color, intensity, texture, etc.) in order to simplify the detection and classification of objects in the scene.

Through segmentation, different objects in the scene are delimited by contours or segments consisting of boundaries such as lines and curves (closely related to edges). In addition, 3D image segmentation allows for subsequent 3D rendering of multiple objects and a quantitative analysis for their size, density and other parameters. Edges identified by edge detection are often disconnected while object segmentation needs closed region boundaries. There is no overlap between different regions and the union of all the segmented regions generates the entire image.

Segmentation can also be applied to a stack of images (this is typical in medical imaging) so that the resulting contours can allow for 3D reconstructions through a kind of interpolation algorithm (e.g. Marching cubes). Many algorithms and techniques have been proposed for image segmentation, especially in the biomedical field. Particularly, the selected technique must be matched with the application's specific knowledge to get the best results.

Intelligent Segmentation Engine

An important aspect of the invention is the custom Intelligent Segmentation Engine (ISE) 300 provided for the system 200. It consists of five main components, depth threshold computing 310, labeling 320, classification 330, assistant module 340, and objects 350, designed to achieve automatic segmentation and classification while providing "expert information" to 2D algorithms.

(1) Depth Threshold Computing

A set of depth thresholds are computed (310) in order to extract labeled regions (e.g. foreground, background, etc.) from the depth image of camera 220. It should be noted that a unique global threshold generally fails to detect all objects. Many known algorithms are available for this task.

(2) Labeling

For all the computed depth thresholds, some objects are extracted and labeled in 320.

(3) Classification

For all different extracted objects, the following processing steps are performed as part of classification 330.

Robust 3D geometrical shape descriptors are computed in order to get a meaningful classification metric.

Shape descriptors of the current object are compared to those in already available records stored in a local or remote data base. Based on this comparison, the current object can be said "new OBJ" (never seen before) or "old OBJ" (already seen before).

An additional information called "reinforcement" is associated to every object in the data base. It is used as a weight factor in the previous comparison: objects with stronger reinforcement (i.e. more frequently classified) will be preferred in case of doubtful comparisons. It could also be possible to define a set of rules in order to better exploit this information to improve future object classifications.

(4) Assistant Module (AM)

Classified objects can be either new objects or object already found in past images as determined classification 330. For both new and old OBJs, a set of specific 2D ROIs, corresponding to currently recognized 3D objects, are set as actual input for 2D algorithms. In case of "old OBJ", together with the ROIs, some additional "expert information" about the expected output identification or inspection can be supplied to the 2D algorithms to facilitate their operations. A ROI is typically defined as the borders of an object or the polygonal shape of an item in a 2D image. An example of the types of information discussed above is provided in TAB 1.

TABLE 1

| EXPERT_INFORMATION | |
|---|---|
| ROIS | Regions of interest defined as one or more irregular 2D image sub-regions corresponding to one or more classified OBJs |
| EXP_POS (old OBJ only) | For every ROI, the expected (probable) location of all items already identified in previous object occurrences (past acquisitions). |
| EXP_SIZE (old OBJ only) | For every ROI, the expected (probable) size of all items already identified in previous object occurrences (past acquisitions). |
| EXP_MODULE (old OBJ only) | For every ROI, the expected (probable) barcode module (mm/mil) of all items already identified in previous object occurrences (past acquisitions). |

Once the AM 340 receives feedback from 2D algorithms (e.g. identified codes, inspection results), it will be able to:

Enrich the information associated to the objects with the current items identified (new or old objects), by increasing some counters corresponding to the "probabilities" referred in TAB 1, to be stored with the object.

Store the objects in the database: from scratch if "new," updated with reinforcement if "old." Reinforcement consists of a counter to be increased after each new classification of the object.

(5) Objects Database

The object database 350 can be viewed as a declarative memory referred to as general "world knowledge" accumulated through both 3D segmentation, 2D identification, and inspection experience. It is important to know "what an object is," not only to know that "an object exists."

Every OBJ record consists of some fields, as reported in TAB 2, which precisely defines what the object is, what (items) is on its surface, and how much is common (hence, easy to find).

As an option: Additional information called "relations" can be associated to every object in the database (350) to detail its relation with other objects (inclusion, proximity, similarity, etc.). It could be used to facilitate the classification task.

TABLE 2

| OBJECT_RECORD | |
|---|---|
| 3D SHAPE DESCRIPTORS | May be a polygon mesh as a collection of vertices, edges and faces able to define the shape of a polyhedral object in 3D solid modeling (faces usually consist of triangles). |
| ITEMS | Identified patterns (barcodes, OCR text strings, inspection symbols) on the object, with related "expert information" (e.g. positions, sizes and modules). |
| ENRICHMENT | Number of times the items has been identified |
| REINFORCEMENT | Number of times the object has been classified |

Figure 4:
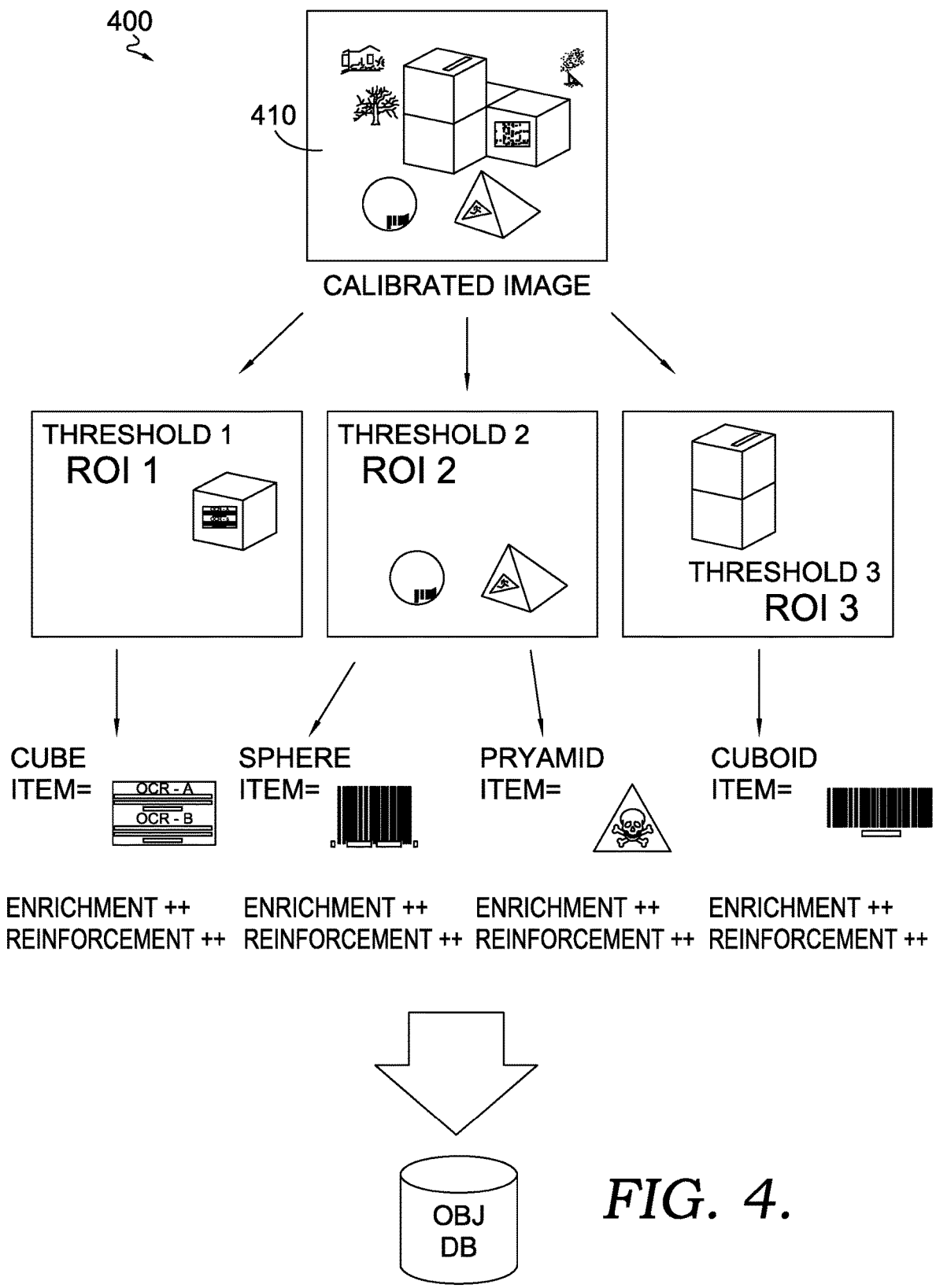
FIG. 4 illustrates an exemplary operational overview of combined 2D and 3D cameras for machine vision and identification, in an implementation of an embodiment of the invention.

In FIG. 4, a concept overview 400 is shown. An image 410 is captured with cameras 210 and 220 and processed with ISE 300.

A very important point of the invention lies in its ability to enable real-time processing of actual complex scenes. Particularly, a brute force approach that uses high-resolution 3D images (e.g. by stereo cameras or structured light) associated with high computational-load machine learning methods (e.g. deep convolutional neural networks, Bayesian networks, etc.) would probably require more processing time and specific hardware resources (such as dedicated GPUs) that are not compatible with the invention, in low cost automatic identification and machine vision applications.

More specifically, embodiments of the invention use the following elements in a compact package:

A Low Resolution 3D TOF Camera

Since the depth image involves a small number of data points (e.g. 320×240 pixels, QVGA), computing depth thresholds to extract labeled regions and computing raw shape descriptors (there is no need to model any object detail) can be considered a low computational-load task, feasible in the embedded environment.

A High Resolution 2D Camera

The maximum benefits in terms of processing time can be achieved when using a high-resolution 2D imager (e.g. sensors with more than 5 megapixels). This is because a low resolution 3D camera effectively filter information to 2D algorithms.

A Simple Reinforcement/Enrichment Approach

Instead of a huge machine learning method, collected EXPERT_INFORMATION is used to be linked with OBJECT_RECORDs that can be managed by means of simple row/column tables. In other words, the most "reinforced" objects will be the first to be searched during the classification phase (and it will be first searched in the most likely positions).

Limited/Prioritized 2D Image to be Processed

A further processing time saving is due to the fact that 2D identification and machine vision algorithms can take advantage of EXPERT_INFORMATION to analyze first (or even exclusively) the region of image associated with the segmented 3D object. In addition, the algorithm parameters can be automatically adjusted over that region in agreement with the expected items that will most likely be found (this information is stored as "enrichment").

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned invention can be completed without departing from the scope of the claims below. Certain features and sub-combinations are of utility and may be employed without reference to other features and sub-combinations and are contemplated within the scope of the claims.

Having thus described the invention, what is claimed is:

1. A method of object recognition in a hybrid 2D/3D vision system, comprising:

acquiring a three-dimensional image of an object into a vision device, wherein the vision device has a processor coupled to a memory;

acquiring one or more two-dimensional images of the object into the vision device, wherein the three-dimensional image is associated with the one or more two-dimensional images;

identifying the three-dimensional image through three-dimensional shape recognition, wherein identifying the three-dimensional image comprises comparing one or more shapes in the three-dimensional image to objects stored in a database, and wherein a union of the one or more shapes generates the three-dimensional image;

if a member of the one or more shapes of the three-dimensional image matches to one of the objects in the database, associating the one of the objects to a region of interest from the one or more two-dimensional images;

simultaneously, analyzing the member of the one or more shapes of the three-dimensional image that matches to the one of the objects and the region of interest from the one or more two-dimensional images; and detecting a new region of interest from the one or more two-dimensional images if another member of the one or more shapes of the three-dimensional image does not match to another one of the objects in the database; and increasing a counter at the object responsive to a shape descriptor of the object being compared and matched to the one of the other shape descriptors in the database, wherein a highest value of the counter of the object indicates the strongest reinforcement over the other objects in the database with a lower value of the counter.

2. The method of claim 1, wherein the new region of interest is stored in the database or another database.

3. The method of claim 1, wherein the database is a local database.

4. A method of object recognition in a hybrid 2D/3D vision system, comprising:

acquiring a three-dimensional image of an object into a vision device, wherein the vision device has a processor coupled to a memory;

acquiring one or more two-dimensional images of the object into the vision device, wherein the three-dimensional image is associated with the one or more two-dimensional images;

computing shape descriptors for the object;

comparing the shape descriptors for the object to other shape descriptors that are stored in a database;

if a shape descriptor of the object matches one of the other shape descriptors in the database, designating the object as an old object that is already in the database, wherein the object matches the old object in the database;

if the shape descriptor of the object does not match one of the other shape descriptors in the database, designating the object as a new object and storing the object in the database;

where the object matches the old object in the database, assigning a weight factor or reinforcement to the object;

increasing the weight factor or reinforcement of the object each time the shape descriptor of the object is used in a comparison and matches to the one of the other shape descriptors, wherein the object that is more frequently classified has a stronger reinforcement; and for a comparison that is not sufficient, using the object that has a strongest reinforcement over other objects in the database with lesser reinforcements.

5. The method of claim 4, further comprising updating the object upon a subsequent comparison and the object is already in the database designated as the old object or the new object.

6. The method of claim 4, wherein the shape descriptors are the contours or shapes of items that are described.

7. A compact and portable device, comprising:
a high-resolution two-dimensional (2D) camera configured to capture 2D image;
a low-resolution three-dimensional (3D) camera configured to capture a 3D image, wherein the 3D image is mapped into the 2D image to form a calibrated image; and
a segmentation engine configured to:
compute shape descriptors for the objects;
compare the shape descriptors for the object to other shape descriptors that are stored in a database and in response thereto;
designate the object as a new object and storing the object in the database if the shape descriptor of the object does not match one of the other shape descriptors in the database;
assign reinforcement information to the shape descriptors stored in the database; and
adjust the reinforcement information of at least one of the shape descriptors stored in the database each time the respective shape descriptor is determined to match the shape descriptor of the object being analyzed,
wherein the reinforcement information is a weight factor, and wherein the segmentation engine is configured to compare the shape descriptors for the object to other shape descriptors that are stored in a database by first searching for shape descriptors stored in the database that have higher weight factors before searching for shape descriptors having lower weight factors.

8. The device of claim 7, wherein the low-resolution 3D camera has reduced 3D computational overload and power consumption.

9. The device of claim 7, wherein the high-resolution 2D camera and the low-resolution 3D camera have sensors optimized for the infrared (IR) range.

10. The device of claim 7, wherein the high-resolution 2D camera has a sensor optimized for the visible range and the low-resolution 3D camera have a sensor optimized for the infrared (IR) range.

11. The device of claim 7, wherein the high-resolution 2D camera and the low-resolution 3D camera simultaneously frame-grab an image.

12. The method of claim 6, further comprising applying a threshold to the 3D image to discard background objects in the 3D image.

13. The device of claim 7, wherein the 3D camera includes a time-of-light sensor.

14. The device of claim 7, further comprising a lighting system shared by the 2D camera and 3D camera.

15. The device of claim 7, wherein the 2D camera and 3D camera are mounted together to have parallel optical axes, wherein a first sensor of the 2D camera and a second sensor of the 3D camera point in a same direction and have similar viewing areas.

16. The device of claim 15, wherein the 3D camera is mounted on top of the 2D camera within a common geometrical environment.

17. The device of claim 7, wherein the weight factor is based on a counter being increased each time the respective shape descriptor is determined to match the shape descriptor of the object being analyzed.

18. The method of claim 1, wherein the region of interest is defined by borders of the object from the two-dimensional image.

* * * * *